United States Patent [19]

O'Dell et al.

[11] Patent Number: 5,422,168
[45] Date of Patent: Jun. 6, 1995

[54] LOW PRESSURE BOARD

[75] Inventors: Robin D. O'Dell, Pasadena, Md.; William C. Decker, III, Raleigh, N.C.; Joseph A. Lex, Pasadena, Md.

[73] Assignee: International Paper Company, Odenton, Md.

[21] Appl. No.: 190,452

[22] Filed: Feb. 2, 1994

[51] Int. Cl.⁶ .............................. B32B 3/00; B32B 5/16
[52] U.S. Cl. ............................... 428/211; 428/326; 428/532; 428/535; 428/537.7
[58] Field of Search ............... 428/532, 535, 537.7, 428/326, 211

[56] References Cited

U.S. PATENT DOCUMENTS

| | | |
|---|---|---|
| 2,281,483 | 4/1942 | Edgar . |
| 2,462,253 | 2/1949 | Booty . |
| 2,862,897 | 12/1958 | Barrentine et al. . |
| 2,996,461 | 8/1961 | Kaufman et al. . |
| 3,124,474 | 3/1964 | Beaver et al. . |
| 3,366,532 | 1/1968 | Maskey et al. . |
| 3,373,071 | 3/1968 | Fuerst ............................ 428/451 |
| 3,498,869 | 3/1970 | Murakami et al. . |
| 3,634,184 | 1/1972 | Wang . |
| 4,255,480 | 3/1981 | Scher et al. . |
| 4,263,081 | 4/1981 | Scher et al. . |
| 4,305,987 | 12/1981 | Scher et al. . |
| 4,327,141 | 4/1982 | Scher et al. . |
| 4,395,452 | 7/1983 | Scher et al. . |
| 4,396,453 | 8/1983 | Krankkala . |
| 4,400,423 | 8/1983 | Scher et al. . |
| 4,430,375 | 2/1984 | Scher et al. . |
| 4,576,981 | 3/1986 | Hilger et al. . |
| 4,783,315 | 11/1988 | Arai et al. . |
| 4,971,855 | 11/1990 | Lex et al. . |
| 5,037,694 | 8/1991 | Ungar et al. . |

Primary Examiner—P. C. Sluby
Attorney, Agent, or Firm—Browdy and Neimark

[57] ABSTRACT

A low-pressure board having reduced show-through and reduced resin migration is obtained by interposing a coating between the decor sheet and the substrate, e.g. fiberboard, chipboard or particle board, which is preferably microcrystalline cellulose or a mixture of microcrystalline cellulose with CMC at a dry-coating weight of 2-16 pounds per ream, preferably 4 pounds per ream.

15 Claims, 1 Drawing Sheet

LOW PRESSURE BOARD

FIELD OF INVENTION

The present invention relates to low pressure board, sometimes called low pressure laminate or melamine faced chipboard (MFC), and more particularly to such a product manufactured at a low cost and having an improved appearance.

BACKGROUND OF THE INVENTION

Low pressure board or low pressure laminate is a well known, industrially important, and moderate to low cost product used in many industries including the furniture industry. In general, it is formed by a low pressure laminating procedure utilizing a suitable substrate and a decorative facing sheet or decor sheet which is impregnated with a thermosettable resin such as melamine-formaldehyde resin, often simply called "melamine resin", some other amino resin such as urea-formaldehyde resin, or an unsaturated polyester resin, and optionally with a similar resin impregnated barrier sheet interposed between the substrate and the decor sheet. The substrate can be formed of a variety of materials, such as thermosettable resin impregnated paper sheets, but more usually chipboard, fiberboard such as MASONITE ® fiberboard, particle board or the like.

One of the problems which has occurred in the manufacture of low pressure board is the tendency of the backing board or substrate, particularly if it is a rough material such as chipboard or particle board, to be visible through the decorative facing paper. This phenomenon is known as "show-through" and, unless special efforts are taken, the texture and/or the color of the backing board may show through the decor sheet, which is commercially undesirable. Over the years, a number of expedients have been developed to deal with this problem, but these expedients invariably are unduly expensive, create additional problems and/or fail to fully solve the problem. In addition to the problem of show-through, the backing board, or substrate often has a tendency to drain the thermosettable impregnating resin from the decor sheet during pressing, i.e. the backing board seems to soak up the resin from the decor sheet during pressing, giving the product a poor appearance, e.g. a mottled appearance due to insufficient resin being present after lamination in the decorative facing sheet.

One solution to both the problem of show-through and migration of resin from the facing sheet to the substrate during pressing is the use of special facing paper having a very high density. However, this solution to the problem is expensive in two regards, i.e. the paper is expensive to begin with and, because of its high density, it is difficult to adequately impregnate with the thermosettable resin. Thus, while the use of high density facing paper is a partial solution to the aforementioned problems, it is available only at a substantially increased price which many customers are unwilling to pay.

Other proposed solutions to the above-mentioned problems have centered on back coating the decor paper with excess resin and the use of the optional barrier sheet. It has also been proposed to back coat the decor paper with a titanium dioxide filled acrylic resin in order to attempt to form a barrier layer between the decorative facing sheet and the substrate in order to reduce show-through as well as migration of the thermosettable resin from the facing sheet to the substrate. These techniques have not been fully satisfactory for the reasons noted above.

Microcrystalline cellulose, sold commercially under the trademark AVICEL, is an unusual colloidal form of cellulose which has found substantial use in a wide variety of industries, including the food, pharmaceutical and cosmetics industries as a suspending, extending, thickening and pseudoplastic agent. Microcrystalline cellulose has also been used extensively in the laminate industry as a binder material for abrasion resistant particles in order to impart abrasion resistance to the upper surfaces of such laminates, noting such patents as Scher et al U.S. Pat. No. 4,395,452 and its related patents; O'Dell et al U.S. Pat. No. 4,499,137; Ungar et al U.S. Pat. Nos. 4,713,138 and 5,037,694; and Lex et al U.S. Pat. No. 4,971,855, among others. Early patents dealing with microcrystalline cellulose are the Battista U.S. Pat. Nos. 3,157,518; 3,259,537 and 3,275,580; Battista is also the author of a book on microcrystalline cellulose. The Fuerst U.S. Pat. No. 3,373,071 shows a cast in situ overlay formed of microcrystalline cellulose, resin and grit. Scher et al U.S. Pat. No. 4,400,423 and its related patents show the use of a second layer of microcrystalline cellulose above a print sheet and below a top layer of microcrystalline cellulose and grit.

Insofar as is known, microcrystalline cellulose or the like has not been contemplated for use as a barrier layer coating between a decorative print sheet and a substrate in the manufacture of low pressure board.

SUMMARY OF THE INVENTION

It is, accordingly, an object of the present invention to overcome deficiencies in the prior art, such as those indicated above.

It is another object of the present invention to provide improved low pressure board which is economical and in which an effective barrier layer is interposed between the decor sheet and the substrate in order to prevent or at least reduce show-through and bleeding of the resin from the decor sheet to the substrate.

It is a further object of the present invention to provide for improved decorative laminates having an effective barrier layer located between the decorative sheet and the substrate.

These and other objects of the present invention are achieved by providing the decor sheet with a barrier layer back coating of microcrystalline cellulose or the like. The barrier layer coating can alternatively be placed on the optional barrier sheet. This provides, at very little cost, a better product with less show-through of any texture and/or color from the backing board substrate, and without the necessity of using high cost high-density paper. When printed decorative sheets are used, such as in the manufacture of low pressure board simulating wood for furniture usage, the resultant visual image is crisp and clear and substantially the same as that produced in the manufacture of high pressure laminates.

BRIEF DESCRIPTION OF DRAWING

Other objects and the nature and advantages of the present invention will be more apparent from the following detailed description of various embodiments, taken in conjunction with the drawing, wherein.

DETAILED DESCRIPTION OF EMBODIMENTS

Figure 1:
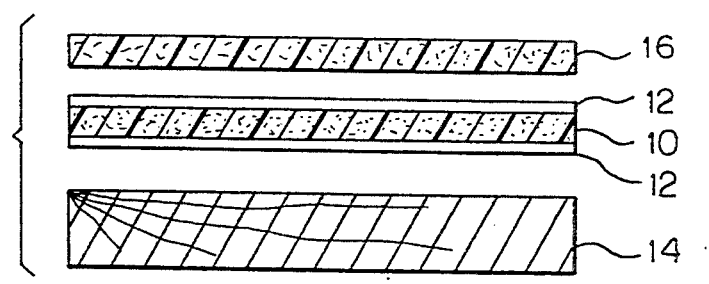
FIG. 1 is a schematic cross-sectional view of a first embodiment of the present invention.

A key aspect of the present invention is the utilization of microcrystalline cellulose or the like as a coated barrier layer interposed between the decorative sheet and the backing board or substrate. Microcrystalline cellulose is available commercially in the form of AVICEL TM, the latter consisting of 85-90% microcrystalline cellulose and 10-15% carboxy methyl cellulose. For best results, it is desirable to use such AVICEL TM, plus an additional quantity of a cellulose ether such as carboxy methyl cellulose, e.g. up to an additional about 15% of the carboxy methyl cellulose based on the weight of the AVICEL TM. Water-soluble cellulose ethers other than carboxy methyl cellulose may be used in place of the carboxy methyl cellulose (CMC), such as carboxy methyl 2-hydroxy ethyl cellulose, 2-hydroxy ethyl cellulose, methyl cellulose, 2-hydroxy propyl methyl cellulose, 2-hydroxy ethyl methyl cellulose, 2-hydroxy butyl methyl cellulose, 2-hydroxy ethyl ethyl cellulose and 2-hydroxy propyl cellulose.

It has been indicated above that microcrystalline cellulose constitutes the preferred and best coated barrier layer material. However, certain other materials can be used in place of or in addition to the microcrystalline cellulose. When used in place of microcrystalline cellulose, these other materials do not function as well as microcrystalline cellulose; and when used along with microcrystalline cellulose, they provide little in the way of additional benefit. These alternative materials include sodium alginate, commercially available as KELGIN TM, and a variety of water soluble polymers such as polyvinyl alcohol and polyvinylpyrollidone. If these materials are used in place of or in addition to microcrystalline cellulose, it may be necessary to utilize them at a higher coating rate in order to achieve satisfactory results.

The barrier layer may be applied as a coating simply to the back or bottom side of the decorative sheet. Alternatively, the barrier layer can be used in conjunction with a barrier sheet, i.e. an extra sheet of paper interposed between the decorative sheet and the substrate board, in which case the barrier coating layer can be applied to either or both surfaces of the barrier sheet or to only one surface thereof. When using a barrier sheet, such barrier sheet also must be resin impregnated, e.g. impregnated with polyester resin, melamine resin, urea resin or even phenolic resin. A resin impregnated overlay layer may also be used over the decor sheet in accordance with known practice.

In the usual way, the decor sheet is impregnated with a suitable thermosetting resin, usually either melamine resin, urea resin or polyester resin. The decorative sheet may be either precoated on its bottom surface with the microcrystalline barrier layer and then impregnated with resin such as generally shown in the aforementioned Scher et al U.S. Pat. No. 4,395,452, the contents of which are hereby incorporated by reference; or instead it may be simultaneously coated on its bottom with the microcrystalline cellulose barrier layer and impregnated with the thermosettable resin in substantially one step as generally disclosed in the aforementioned Ungar et al U.S. Pat. No. 4,713,138, the contents of which are hereby incorporated by reference.

A third and less preferred alternative is to first impregnate the decorative sheet with the selected thermosettable resin, and then coat it with the barrier layer. This third alternative is less advantageous from a handling point of view, because the already resin impregnated paper is brittle and is easily broken. Moreover, when the barrier layer is the preferred microcrystalline cellulose, or Na alginate, the barrier layer will disadvantageously not contain thermosettable resin when the third alternative is used. On the other hand, this third alternative has an advantage when the barrier layer is formed of a water soluble polymer in that the polymer will not be in part washed from the surface of the coated sheet during impregnation with an aqueous resin solution.

Consistent with usual practice in the manufacture of low pressure board or MFC, the backing board or substrate may be chipboard, fiberboard such as MASONITE ® fiberboard, particle board, or even resin impregnated paper sheets.

Insofar as coating weight of the barrier layer is concerned, the preferred mixture of AVICEL TM plus 10% of additional CMC based on the weight of the AVICEL TM is preferably coated at the rate of 2-16 lbs. per ream, preferably 2-10 lbs. per ream, dry weight. This coating weight is also suitable for sodium alginate.

The following examples are offered illustratively:

EXAMPLE 1

With reference to FIG. 1, a barrier sheet 10 formed of paper is coated with a microcrystalline cellulose barrier layer 12 on both surfaces thereof, such as by dipping, while simultaneously impregnating the barrier sheet with melamine resin (see Ungar et al U.S. Pat. No. 4,713,138) in a series of runs so as to provide a coating weight on each surface of 2-8 pounds/ream (dry basis) of AVICEL TM and CMC using the following composition:

| | |
|---|---|
| Melamine resin | 100 gallons |
| Water | 10 gallons |
| CMC | 2 lbs. |
| AVICEL TM | 8 lbs. |
| Hypersal XT-793 (anti-foaming surfactant) | 1.35 liters |
| Hardner MH-835 (melamine resin accelerant) | 1.75 liters |

The impregnation/coating composition is formed as follows: The CMC is dissolved in the 10 gallons of water; the melamine resin is then added under agitation, followed by adding the AVICEL TM while maintaining homogenization until the AVICEL TM has fully dispersed. The anti-foaming surfactant is then added with agitation and finally the Hardner is added while maintaining agitation. As indicated above, the barrier sheet is then simultaneously impregnated and coated at varying rates between 2 and 8 pounds per ream per side, providing a total of 4-16 pounds per ream (dry weight of CMC plus AVICEL TM).

Using particle board 14 as the backing and normal melamine resin impregnated decor paper 16, each of the assemblies is then laid up as shown in FIG. 1 and pressed under heat and pressure.

EXAMPLE 2

Figure 2:
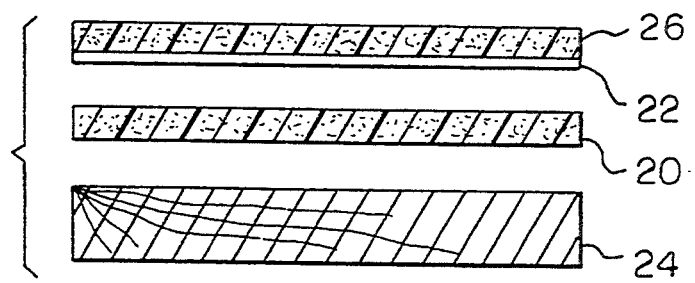
FIG. 2 is a schematic cross-sectional view of a second embodiment in accordance with the present invention.

The composition of Example 1 is utilized to coat the back surface of a series of decor sheets 26 to provide a microcrystalline cellulose/CMC barrier layer 22 on the backside thereof as shown in FIG. 2, at dry-coating weights of the CMC plus AVICEL ™ of 2-10 pounds per ream. The resultant coated and impregnated decor sheets are then pressed up under conventional heat and pressure in the assemblies as shown in FIG. 2 with an optional resin impregnated barrier sheet 20 and a particle board backing 24.

Good results are obtained either with the intermediate barrier sheet 20 or without the optional barrier sheet 20, although a smoother product is achieved with the barrier sheet 20. A coating weight of 4 pounds per ream dry weight of CMC plus AVICEL ™ for the barrier layer 22 gives excellent results.

EXAMPLE 3

Unimpregnated decor paper 26 (see FIG. 2) is coated with the following back coat formulation:

100 liters water
3 kg AVICEL ™
0.3 kg CMC

The formulation is mixed until the AVICEL ™ is fully dispersed and water is added to adjust the viscosity to a level most convenient for coating. Coatings are applied at a dry coating weight of AVICEL ™ plus CMC of 2-10 pounds per ream, and the coatings 22 are dried at 180° F. (see Scher et al U.S. Pat. No. 4,395,452). The so-coated decor sheets 26 are then impregnated in the conventional way with melamine resin and assemblies are laid up and low pressure board laminates are pressed as set forth above in Example 2.

Results are similar to Example 2, with laminates containing the optional barrier sheet 20 being somewhat smoother, and with a dry coating weight of the barrier layer 22 of 4 pounds per ream being preferred.

EXAMPLE 4

Example 3 is repeated except that in place of the AVICEL ™ there is instead used sodium alginate (KELGIN ™) plus small amounts of CMC and hydroxyethyl cellulose. The decor sheet is back coated at 4 pounds per ream of sodium alginate (dry weight), and the remainder of the process is carried out as explained above in Example 3.

EXAMPLE 5

Additional runs are carried out as described above in Examples 1-4, but instead using chipboard and fiberboard as the substrates. Fully satisfactory results are achieved.

In cases where the backing board substrate is rough as it tends to be with chipboard or particle board, a smoother product is obtained if an intermediate barrier sheet 20 is utilized. Regardless of the presence or absence of such an intermediate barrier sheet, however, the barrier layers 12, 22 reduce show-through as well as bleeding of the resin from the decor sheets 16, 26 to the substrate 14, 24.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In low-pressure board comprising a thermoset resin impregnated decor sheet laminated to a backing board substrate, the improvement comprising barrier means interposed between said substrate and said decor sheet for reducing show-through and inhibiting migration of thermosettable resin from said decor sheet during lamination, said barrier means comprising a barrier layer comprising 2-16 lbs. per ream, dry weight, of a material selected from the group consisting of microcrystalline cellulose, a cellulose ether, a water-soluble polymer and mixtures thereof.

2. A low-pressure board according to claim 1 wherein said barrier layer comprises a coating provided on an under-surface of said decor sheet.

3. A low-pressure board according to claim 1 wherein said, barrier layer, exclusive of resin, consists essentially of a mixture of microcrystalline cellulose and a cellulose ether.

4. A low-pressure board according to claim 3 wherein said barrier layer, exclusive of resin, consists essentially of 75-90% microcrystalline cellulose, with the remainder being carboxy methyl cellulose.

5. A low-pressure board according to claim 1 wherein said barrier layer consists essentially of sodium alginate or a mixture of sodium alginate and at least one cellulose ether.

6. A low-pressure board according to claim 1 further comprising a barrier sheet of paper interposed between said decor sheet and said substrate.

7. A low-pressure board according to claim 6 wherein said barrier layer comprises a coating on at least one surface of said barrier sheet.

8. A low-pressure board according to claim 1 wherein said barrier layer is present in an amount of 2-10 pounds per ream, dry weight.

9. In a low-pressure board comprising a thermoset resin impregnated decor sheet laminated to a backing board substrate, the improvement comprising
   a barrier layer coating provided on an under-surface of said decor sheet and interposed between said substrate and said decor sheet for reducing show through and inhibiting migration of thermosettable resin from said decor sheet during lamination, said barrier layer coating comprising 2-16 lbs. per ream, dry weight, of a mixture of microcrystalline cellulose and a cellulose ether.

10. A low-pressure board according to claim 9 wherein said barrier layer, exclusive of resin, consists essentially of 75-90% microcrystalline cellulose, with the remainder being carboxy methyl cellulose.

11. A low-pressure board according to claim 9 wherein said barrier layer is present in an amount of 2-10 pounds per ream, dry weight.

12. A low-pressure board according to claim 2 wherein said barrier layer is present in an amount of 2-10 pounds per ream, dry weight.

13. In a low-pressure board comprising a thermoset resin impregnated decor sheet laminated to a backing board substrate, the improvement comprising
   barrier means interposed between said substrate and said decor sheet for reducing show through and inhibiting migration of thermosettable resin from said decor sheet during lamination, said barrier means comprising (1) a barrier layer in the form of a barrier layer coating provided on an under-surface of said decor sheet, said barrier layer coating comprising 2-16 lbs, per ream, by weight, of a material selected from the group consisting of microcrystalline cellulose, a cellulose ether, a water-soluble polymer and mixtures thereof, and (2) a barrier sheet formed of paper interposed between said substrate and said barrier layer coating disposed on the under-surface of said decor sheet.

14. A low-pressure board according to claim 13 wherein said barrier layer, exclusive of resin, consists essentially of a mixture of microcrystalline cellulose and a cellulose ether.

15. A low-pressure board according to claim 14 wherein said barrier layer coating is present in an amount of 2-10 pounds per ream, dry weight.

* * * * *